United States Patent
Pathak

(10) Patent No.: US 9,639,669 B2
(45) Date of Patent: May 2, 2017

(54) METHOD OF PREVENTING UNAUTHORIZED COPY AND SCAN AND FACILITATING AUTHORIZED COPY AND SCAN OF PROTECTED DOCUMENTS

(71) Applicant: KONICA MINOLTA LABORATORY U.S.A., INC., San Mateo, CA (US)

(72) Inventor: Rabindra Pathak, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/736,200

(22) Filed: Jun. 10, 2015

(65) Prior Publication Data

US 2016/0364550 A1 Dec. 15, 2016

(51) Int. Cl.
*G06F 21/10* (2013.01)
*H04L 29/06* (2006.01)
(Continued)

(52) U.S. Cl.
CPC .............. *G06F 21/10* (2013.01); *G06F 21/60* (2013.01); *G06F 21/608* (2013.01); *G06F 21/62* (2013.01);
(Continued)

(58) Field of Classification Search
CPC .... G06F 21/10; G06F 21/608; G06F 21/6209; G06F 21/62; G06F 21/6245; G06F 21/60; H04L 63/0428; H04L 63/20
See application file for complete search history.

(56) References Cited

U.S. PATENT DOCUMENTS 8,340,346 B2 * 12/2012 Saito .................. H04N 1/00846
382/100
9,195,808 B1 * 11/2015 Nestler .................... G06F 12/14
(Continued)

FOREIGN PATENT DOCUMENTS

KR 20080032732 4/2008

OTHER PUBLICATIONS

Yu, Yang, and Tzi-cker Chiueh. "Display-only file server: a solution against information theft due to insider attack." Proceedings of the 4th ACM workshop on Digital rights management. ACM, 2004.pp. 31-39.*
(Continued)

*Primary Examiner* — Kari Schmidt
(74) *Attorney, Agent, or Firm* — Chen Yoshimura LLP

(57) ABSTRACT

A method implemented in a system including a copier or scanner connected to a digital rights management (DRM) server, which can prevent unauthorized copy or scan while allowing authorized users to obtain high quality hardcopies or scans. After the copier or scanner scans an input hardcopy document, the server determines whether the scanned document image matches any protected document in the DRM system. If a match is found, and the server determines that the user is permitted to copy or distribute the document, the server transmits an electronic version of the matched document from the DRM system to the copier or user-selected email recipients, so that the user or the email recipients can receive a high quality document. If a matched document is found but the user is not permitted to copy or distribute it, the copier or scanner deletes the scanned document image without printing or saving it.

15 Claims, 7 Drawing Sheets

(51) Int. Cl.
*G06F 21/62* (2013.01)
*G06F 21/60* (2013.01)

(52) U.S. Cl.
CPC ...... *G06F 21/6209* (2013.01); *G06F 21/6245* (2013.01); *H04L 63/0428* (2013.01); *H04L 63/20* (2013.01)

(56) References Cited

U.S. PATENT DOCUMENTS

| | | | | |
|---|---|---|---|---|
| 2005/0262340 | A1* | 11/2005 | Rabb | H04K 1/00 713/165 |
| 2006/0015734 | A1* | 1/2006 | Atobe | G06F 21/10 713/176 |
| 2006/0048224 | A1* | 3/2006 | Duncan | G06F 21/6218 726/22 |
| 2006/0218643 | A1* | 9/2006 | DeYoung | H04N 7/162 726/26 |
| 2007/0265854 | A1* | 11/2007 | Wilbrink | G06Q 30/00 705/1.1 |
| 2010/0325690 | A1* | 12/2010 | Suzuki | H04L 67/306 726/1 |
| 2011/0007348 | A1* | 1/2011 | Yamaizumi | G06F 21/6209 358/1.15 |
| 2011/0075164 | A1 | 3/2011 | Nordback | |
| 2015/0149774 | A1* | 5/2015 | Taima | H04L 63/0428 713/168 |

OTHER PUBLICATIONS

Aaber, Zeyad S., et al. "Preventing document leakage through active document." Internet Security (WorldCIS), 2014 World Congress on. IEEE, 2014.(pp. 53-58).*

Ricoh Company Ltd., "Physical Document Security", http://www.ricoh.com/technology/tech/003_security.html, 3 pages, printed from the Internet on May 8, 2015.

* cited by examiner

METHOD OF PREVENTING UNAUTHORIZED COPY AND SCAN AND FACILITATING AUTHORIZED COPY AND SCAN OF PROTECTED DOCUMENTS

BACKGROUND OF THE INVENTION

Field of the Invention

This invention relates to a document control method, and in particular, it relates to a method that controls the copying and scanning of a hardcopy document to prevent unauthorized copy and scan while allowing authorized users to obtain high quality copies.

Description of Related Art

Technologies exist for preventing unauthorized copying of a hardcopy document. In one such technology, sometimes referred to as "copy guard" or embedded pattern printing, a security pattern, such as a dot pattern or a pattern using other fine symbols, is embedded as background in the hardcopy document (referred to as a first generation copy here). The security pattern is inconspicuous in the first generation copy, but when the first generation copy is photocopied, the security pattern becomes conspicuous. The conspicuous security pattern typically depicts a warning message such as "Do Not Copy," "Void," etc. Some such technology will prevent unauthorized users from making a photocopy at all (e.g., the copy machine is equipped with software that detects certain security patterns), and even when an authorized user is allowed to make a photocopy (e.g. by entering a password), the resulting hardcopy (referred to as a second generation copy here) will still bear the conspicuous security pattern.

Digital rights management (DRM) is a technology used to control access to DRM-protected documents in electronic or hardcopy form. A DRM system typically uses a digital rights management server (DRM server or RMS server) that stores information regarding the protected documents and users of the system, for example, which users have what kind of permission to access which document, in a DRM database. The RMS server can communicate with client computers, printers, scanners, copiers or multi-function devices to perform digital rights management.

SUMMARY

Accordingly, the present invention is directed to a method and related apparatus for facilitating copying or scanning of a hardcopy document which can prevent unauthorized copy or scan while allowing authorized uses to obtain high quality hardcopies or scans.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for generating a hardcopy of an input hardcopy document, implemented in a system including a connected device and a server connected to each other, the connected device being a copying device and/or a scanning device, the server maintaining a digital rights management (DRM) system which stores a plurality of protected documents and a DRM database containing user access permission information, the method including: in response to instructions from a user to perform a requested action, the connected device scanning the input hardcopy document to generate a scanned document image, obtaining document characteristics information from the scanned document image, and transmitting the document characteristics information to the server along with an identity of the user and the requested action, the requested action being one of: making a hardcopy of the input document, scanning the input document to generate an electronic version and to save the electronic version, and scanning the input document to generate an electronic version and to distribute the electronic version to specified recipients; the server performing document matching to determine whether the document characteristics information received from the connected device matches that of any of the plurality of protected documents stored in the DRM system; if the document characteristics information matches that of a protected document stored in the DRM system: the server determining, based on the DRM database, whether the user has permission to perform the requested action to the matched protected document; if the user is determined to have permission to perform the requested action to the matched protected document, the server transmitting a first response with an electronic version of the matched protected document to the connected device, or completing the requested action using the electronic version of the matched protected document; and if the user is determined to have no permission to perform the requested action to the matched protected document, the server transmitting a second response to the connected device; and in response to the first response, the connected device completing the requested action using the received electronic version of the protected document, or in response to the second response, the connected device deleting the document image generated by scanning the input hardcopy document without performing the requested action.

The method may further includes: if the document characteristics information matches that of none of the protected documents stored in the DRM system, the server transmitting a third response to the connected device, or completing the requested action using the scanned document image received from the connected device; and in response to the third response, the connected device completing the requested action using the scanned document image.

In another aspect, the present invention provides a computer program product comprising a computer usable non-transitory medium having a computer readable program code embedded therein for controlling a server, the computer readable program code configured to cause the server to execute a digital rights management (DRM) process, the process including: receiving, from a connected device, document characteristics information, an identity of a user and a requested action, the requested action being one of: making a hardcopy of the input document, scanning the input document to generate an electronic version and to save the electronic version, and scanning the input document to generate an electronic version and to distribute the electronic version to specified recipients; performing document matching to determine whether the document characteristics information received from the connected device matches that of any of the plurality of protected documents stored in the DRM system; and if the document characteristics information matches that of a protected document stored in the DRM system: determining, based on the DRM database, whether the user has permission to perform the requested action to the matched protected document; if the user is determined to have permission to perform the requested action to the matched protected document, transmitting a first response with an electronic version of the matched protected document to the connected device, or completing the requested action using the electronic version of the matched protected document; and if the user is determined to have no permission to perform the requested action to the matched protected document, transmitting a second response to the connected device.

The process may further includes: if the document characteristics information matches that of none of the protected documents stored in the DRM system, transmitting a third response to the connected device, or completing the requested action using a scanned document image of the hardcopy document received from the connected device.

In another aspect, the present invention provides a computer program product comprising a computer usable non-transitory medium having a computer readable program code embedded therein for controlling a copier or a scanner connected to a server, the computer readable program code configured to cause the copier or scanner to execute a process, the process including: in response to instructions from a user to perform a requested action, scanning the input hardcopy document to generate a scanned document image, and obtaining document characteristics information from the scanned document image, the requested action being one of: making a hardcopy of the input document, scanning the input document to generate an electronic version and to save the electronic version, and scanning the input document to generate an electronic version and to distribute the electronic version to specified recipients; transmitting the document characteristics information along with an identity of the user and the requested action to the server; receiving a response from the server, the response being one of: a first response along with an electronic version of a document, a second response, or a third response; in response to the first response, completing the requested action using the received electronic version of the document; in response to the second response, deleting the scanned document image without performing the requested action; and in response to the third response, completing the requested action using the scanned document image.

The document characteristics information includes either a scanned document image generated by scanning the input hardcopy document, or a document ID extracted from the scanned document image, or both.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide methods and apparatus that allow an authorized user who possesses a first generation hardcopy of a DRM protected document to make another first generation hardcopy of the document or to distribute an electronic version of the document that can be printed to produce a first generation hardcopy, while preventing unauthorized user from making any copy or only allowing them to make second generation copies.

Figure 4:
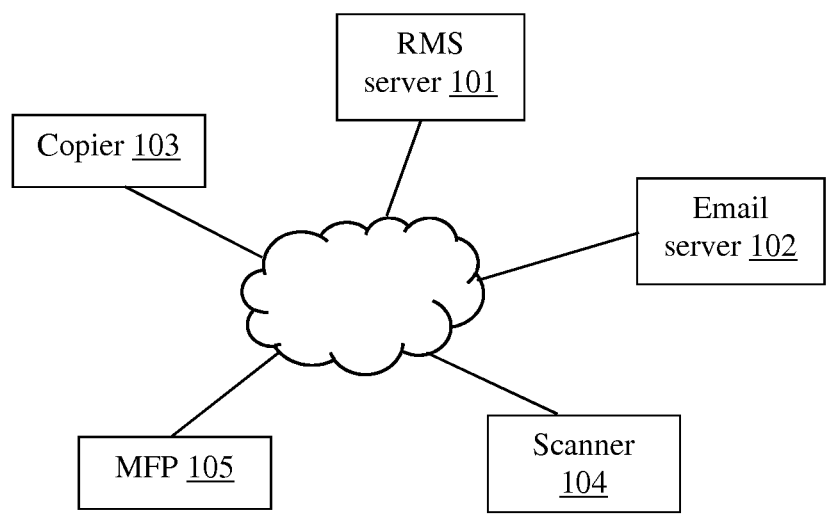
FIG. 4 schematically illustrates a data processing system in which embodiments of the present invention may be implemented.

FIG. 4 schematically illustrates a system in which embodiments of the present invention may be implemented. The system includes a digital rights management server (RMS server) 101, an email server 102, one or more copiers 103 and/or scanners 104 and/or multi-function devices (MFP) 105, connected via one or more networks such as the Internet or an intranet or other networks. The RMS server 101 and the copiers/scanners/MFPs have necessary hardware and software to carry out the steps of the methods described below. The RMS server stores digital versions of DRM-protected documents, as well as a DRM database which contains information regarding user access permissions with respect to the documents, such as which user has what kind of permission (view, print, copy, edit, etc.) to access which document.

Figure 1A:
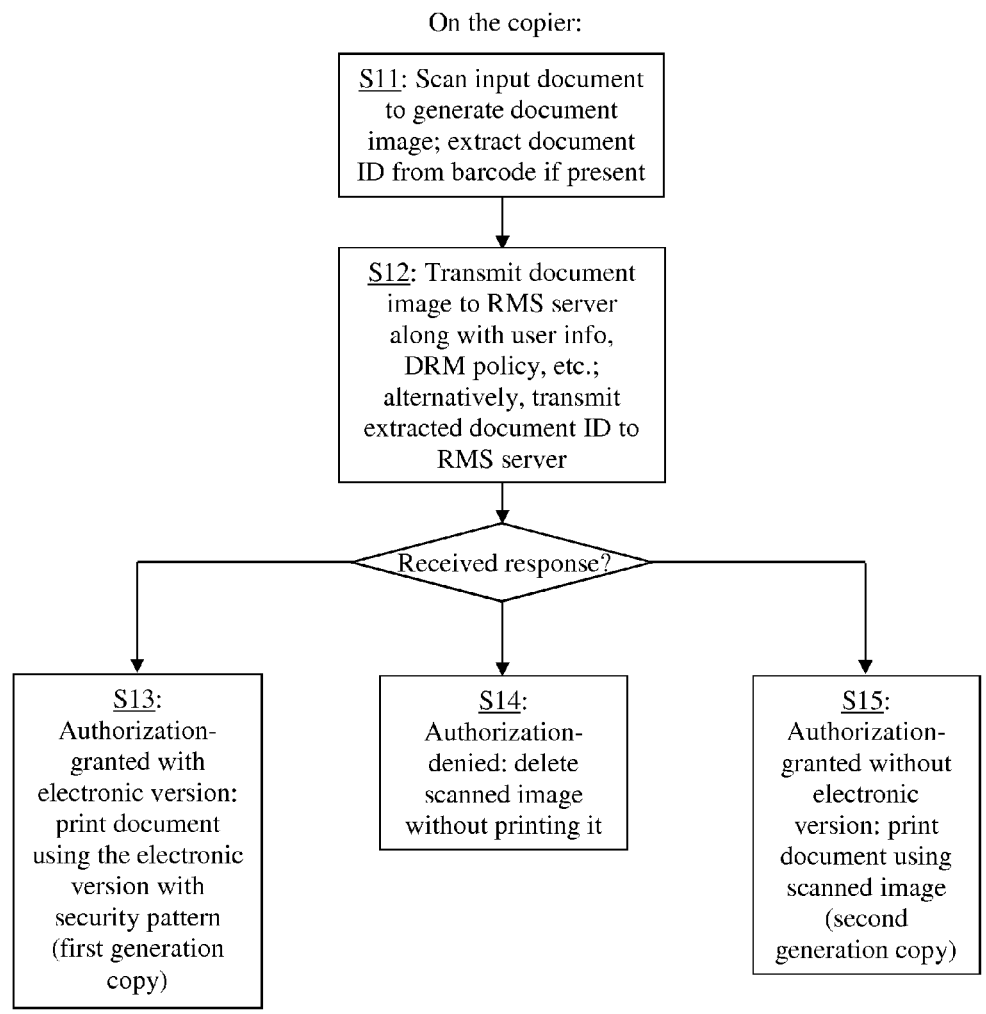
FIGS. 1A and 1B are flowcharts that schematically illustrate a method of making a photocopy of a document according to a first embodiment of the present invention.
Figure 1B:
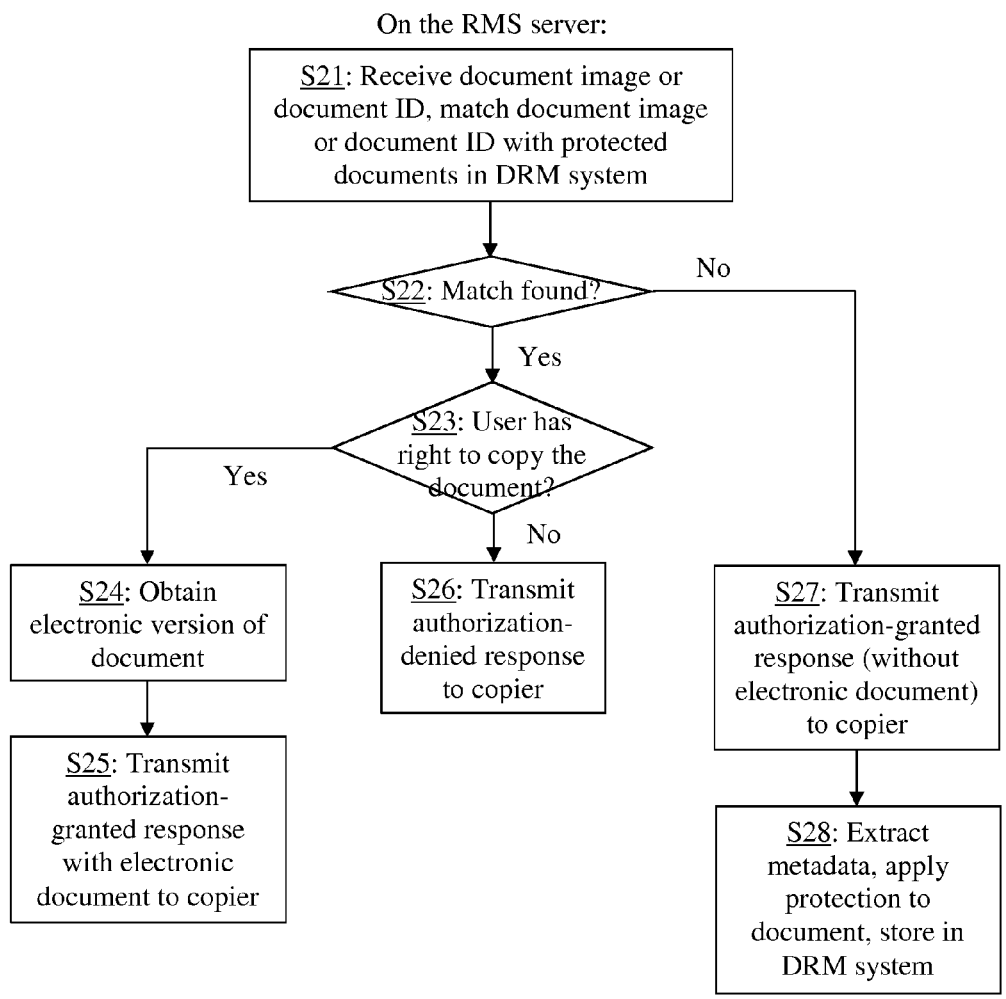

FIGS. 1A and 1B schematically illustrate a method of making a photocopy of a document according to a first embodiment of the present invention. FIG. 1A illustrates the steps performed by a copier and FIG. 1B illustrates the steps performed by the RMS server.

A user, who is a registered user of the DRM system, operates a copier (including an MPF or other machines with a copying function) with the intent to make a photocopy of an input hardcopy document. In response to a user instruction, the copier scans the input hardcopy document to generate a document image (step S11), and transmits the document image to the RMS server (step S12). Other information such as the identity of the user, a DRM protection policy to be applied to the document, etc. is also transmitted to the RMS server in this step.

Sometimes a hardcopy document contains a barcode that encodes a document ID, which can be used to identify the document to the DRM system. In such a case, step S11 includes a step of decoding the barcode and extracting the document ID. Also, in step S12, instead of or in addition to transmitting the scanned document image to the RMS server, the copier can transmit the document ID.

The RMS server, upon receiving the document image, performs document matching to determine whether the document matches (i.e. is the same as) one of the protected documents stored in the DRM system (step S21).

The document matching may be performed in any suitable ways. In one implementation, keyword matching, OCRed text matching and image matching are performed successively to find matching documents. Keywords may have been entered by the user from the copier and can be compared to keywords of stored documents. The document image received from the copier may be processed by optical character recognition (OCR) to extract its text content which can be compared to text contents of stored documents. Finally, the image document can be compared to images of stored documents. Keyword and OCR text matching may be performed first to identify potential matching documents, but a match is found only when the images of the documents match each other.

The document image comparison takes into consideration the security pattern that is often contained in the scanned document image but not in the images of the stored documents. One method is to remove the security pattern (fine dots) in the scanned image, e.g. by down-sampling the image and/or by removing small connected components in the image, before comparing it to the images of the stored documents. Note that this step of removing security pattern may also be performed by the copier before it transmits the document image to the RMS server. Another method is to add a security pattern to the images of the stored document before comparing it to the scanned document image. In the latter case, the security pattern added to the images of the stored document is one that is added to other documents of the DRM system before printing hard copies, so if the scanned document is one protected by the DRM system, the two images will have the same security pattern.

Alternatively, RMS server may receive the document ID from the copier (step S21), in which case the RMS server uses the document ID to determine whether the received document matches the document ID of a stored document on the RMS server in step S22. The document image or the document ID may be generally referred to as document characteristics information.

If the document image and/or document ID from the copier matches a stored protected document on the RMS server ("Yes" in step S22), the RMS server further determines, based on the DRM database, whether the user has permission to copy the protected document (step S23). If the user has the right to copy the document ("Yes" in step S23), the RMS server obtains from the DRM system an electronic version of the matched document (e.g., based on a document ID returned by the matching step) (step S24), and transmits an authorization-granted response along with the electronic version of the document to the copier (step S25). Note that the electronic version of the document obtained from the DRM system may be an encrypted document, in which case the RMS server will decrypt it before transmitting it to the printer, or transmit a decryption key to the printer along with the document. If the copier receives an authorization-granted response along with the electronic version of the document, it prints the document using the electronic version with the inconspicuous security pattern to generate a first generation hardcopy of the document (step S13). Note that the electronic version of the document typically does not contain the security pattern, and the copier is equipped with software to generate the security pattern and add it to the image being printed. Any suitable technology, such as known copy guard technology, may be used to generate the security pattern.

On the RMS server, if in step S23 it is determined that the user does not have the right to copy the document ("No" in step S23), the RMS server transmits an authorization-denied response to the copier (step S26). The copier, in response to receiving the authorization-denied response, deletes the scanned image without printing a copy of the document (step S14), thereby preventing the user from making a copy of the input document. Further, the response sent by the RMS server may include a message to inform the user of the lack of authorization to copy the document. In addition, the RMS server may send an alert (e.g. an email) to the system administrator.

On the RMS server, if the document image and/or document ID from the copier does not match any stored document in the DRM system ("No" in step S22), indicating that it is a new document, the RMS server transmits an authorization-granted response to the copier (but without an electronic version) (step S27). The copier, in response to the authorization-granted response, will print a hardcopy document using the image generated by the scanning step S11 (step S15). The nature of the output document generated in step S15 will depend on the input hardcopy document that the user used to make a copy: If the input document has an inconspicuous security pattern (first generation copy), the output document will bear a conspicuous security pattern (i.e. a second generation copy is produced).

For a new document (and provided that if the RMS server has received the scanned document image from the copier), the RMS server also extracts metadata for the document, and applies protection to the document and adds it to the DRM system as a protected document (step S28). The metadata referred to here may include, for example, date of creation, the user who created it, title of the document, its author, keywords, etc., and any other desirable information. The metadata may include information entered by the user by operating the copier (that information will have been transmitted from the copier to the RMS server in step S12), information extracted by OCR, etc. The metadata extraction process may use machine learning to gain the ability to decide what constitutes useful metadata. The step of applying protection to the document includes, for example, generating an encryption key for the document, storing the encryption key and the user access permission information for this document in the DRM database, encrypting the document, and storing the encrypted document. The user access permission information, e.g. which users have what kind of access permissions, has been inputted by the user at the copier and transmitted by the copier to the RMS server.

Note that the document matching and metadata extraction steps may be performed by respective software modules of the RMS server.

In an alternative embodiment (not shown in FIG. 1), if the RMS server determines that a matching document exists in the DRM system but the user is not authorized to make a first generation copy, the RMS server transmits a limited-authorization response to the printer, in which case the printer uses the scanned image obtained in step S11 to generate a printed hardcopy, resulting in a second generation copy bearing a conspicuous security pattern. Thus, the DRM system has the ability to differentiate three kinds of users with respect to the document: those who have the right to make a first generation hardcopy of the document, those who have the right to only make a second generation (or later generation) hardcopy, and those who have no rights to make any kind of copy.

Using a method described above, an authorized user who has a first generation hardcopy document is able to produce another first generation copy. Using conventional copy guard technologies, the user can only produce a second generation copy.

Figure 2A:
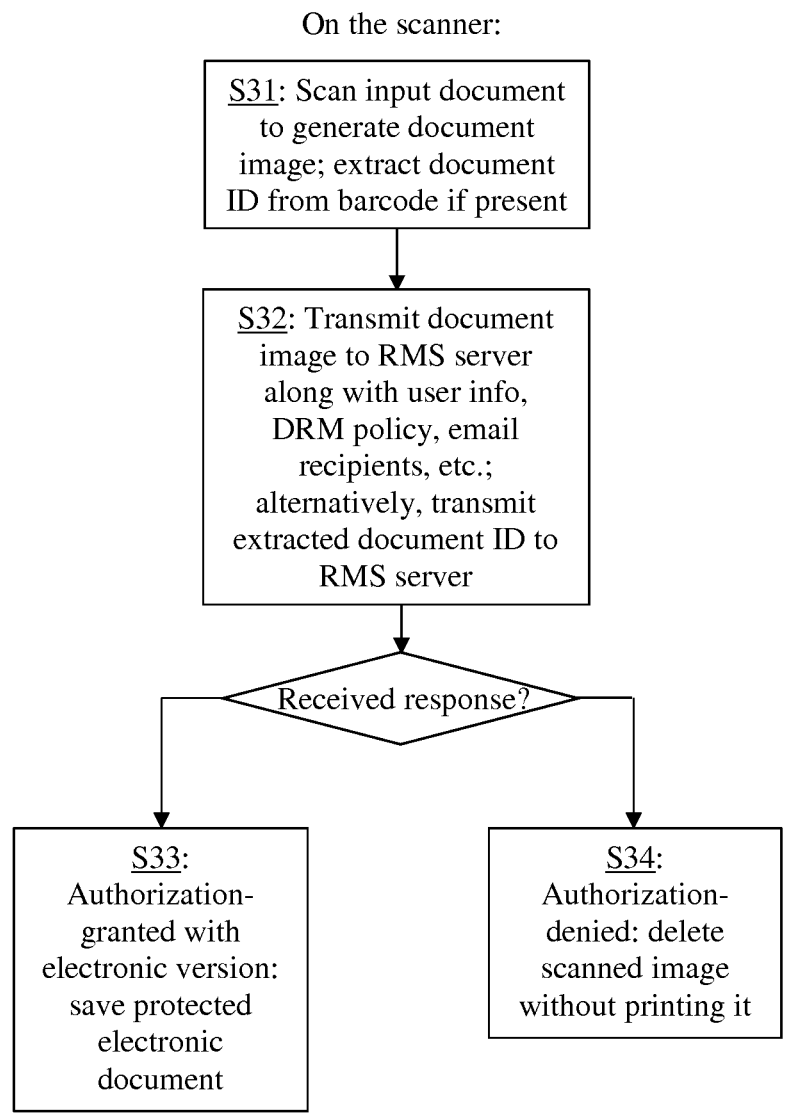
FIGS. 2A and 2B are flowcharts that schematically illustrate a method of scanning a document and saving and/or distributing the electronic copy according to a second embodiment of the present invention.
Figure 2B:
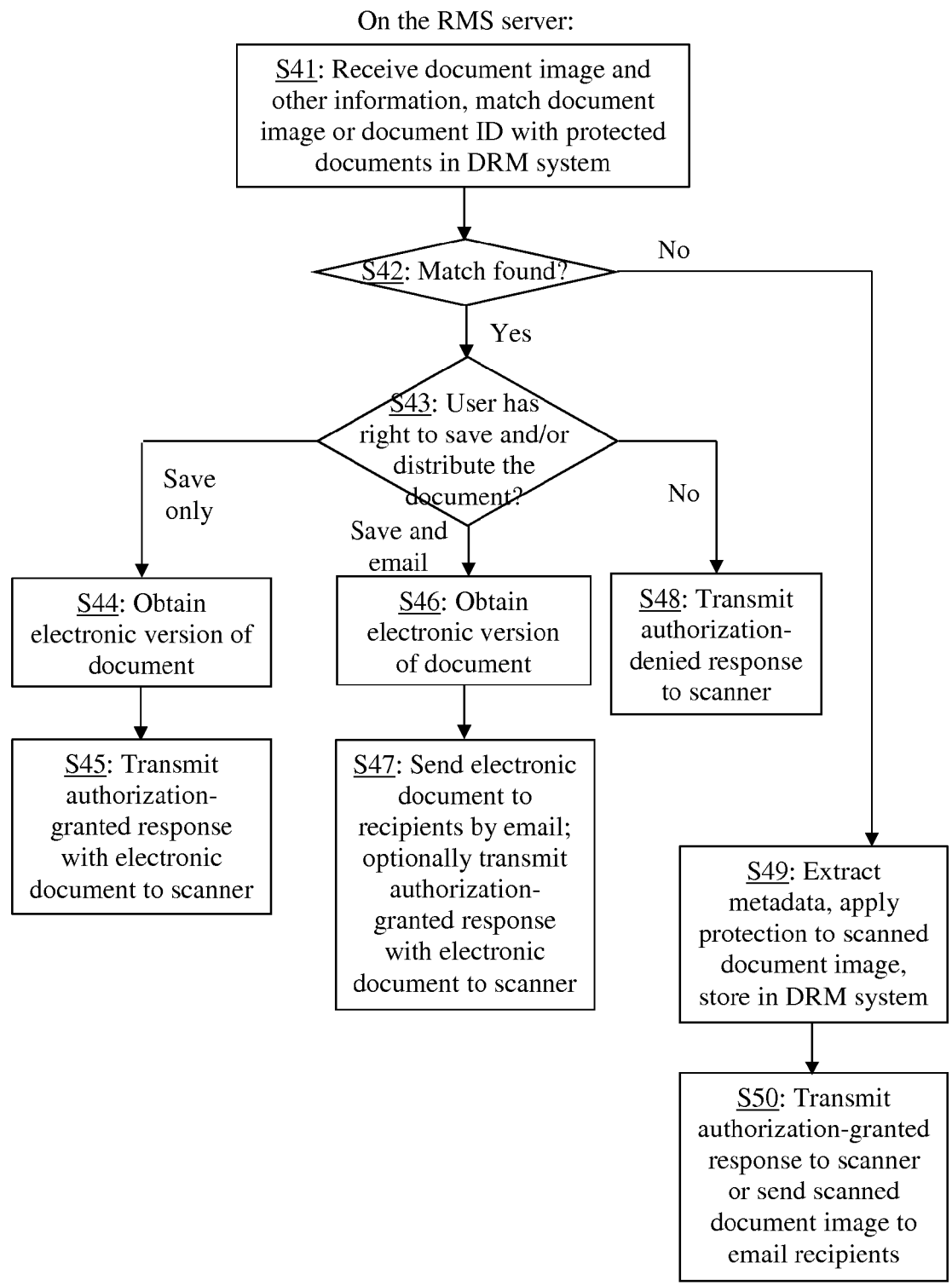

FIGS. 2A and 2B schematically illustrate a method of scanning a document and saving and/or distributing the electronic document according to a second embodiment of the present invention. Many steps of this process are similar to those in the first embodiment. FIG. 2A illustrates the steps performed by a scanner and FIG. 2B illustrates the steps performed by the RMS server.

A user, who is a registered user of the DRM system, intends to use a scanner (including an MPF or other machines with a scanning function) to generate an electronic version of an input hardcopy document and save it and/or distribute it to others, e.g. via email. The scanner scans the input document to generate a document image (step S31), and transmits the document image to the RMS server (step S32). Other information such as the identity of the user, a DRM protection policy to be applied to the document, a list of recipients to whom the document is to be distributed (if any, as specified by the user using the scanner), etc. is also transmitted to the RMS server in this step. Alternatively, when a document ID has been encoded in a barcode present in the document image, the document ID is extracted in step S31 and transmitted to the RMS server instead of or in addition to the document image in step S32. The RMS server, upon receiving the document image and the other information and/or the document ID, performs document matching to determine whether the document matches (i.e. is the same as) one of the protected documents stored on the RMS server (step S41). The document matching step S41 is similar to the document matching step S21 in the first amendment.

If the document image and/or document ID from the scanner matches a stored protected document in the DRM system ("Yes" in step S42), the RMS server further determines, based on the DRM database, whether the user has permission to scan and save the protected document and/or distribute it to the recipients specified by the user (step S43). In this step, the user may be determined to (1) have rights to scan and save the electronic version of the document but no right to email it to the recipients he selected, (2) have rights to scan and distribute (e.g. via email) the electronic version of the document to the recipients he selected, and (3) has no right to save or distribute the electronic version of the document.

If the user has the right to scan and save but not to distribute the document ("Save only" in step S43), the RMS server obtains from the DRM system an electronic version of the matched document (e.g., based on a document ID returned by the matching step) (step S44), and transmits an authorization-granted response along with the electronic version of the document to the scanner (step S45). On the scanner, upon receiving the authorization-granted response along with the electronic version of the document, it saves the document in a storage device (step S33). Note that the electronic version of the document that the RMS server obtained from the DRM system is a protected document, and may be an encrypted document.

If in step S43 it is determined that the user has right to scan and save as well as distribute the document to the specified recipients ("Save and email" in step S43), the RMS server obtains an electronic version of the matched document stored the DRM system (step S46), and transmits the electronic document to each of the specified recipients via email (step S47). Note that the electronic version of the matched document is a DRM protected document and may be encrypted.

In this step, the RMS may send the electronic document to the user by email as well. The RMS server may cooperate with an email server to perform this step. Alternatively or in addition, in step S47 the RMS server may transmits the electronic document to the scanner with an authorization-granted response, and the scanner will transmit the document to the recipients by email.

If in step S43 it is determined that the user has no rights to save or distribute the document ("No" in step S43), the RMS server transmits an authorization-denied response to the scanner (step S48). The scanner, in response to receiving the authorization-denied response, deletes the scanned image without saving a copy (step S34), thereby preventing the user from obtaining an electronic version of the input hardcopy document. Further, the response sent by the RMS server may include a message to inform the user of his lack of authorization to save and/or distribute the document. Such a message may alternatively be sent to the user by email. In addition, the RMS server may send an alert (e.g. an email) to the system administrator.

If in step S42 the document image and/or document ID from the copier does not match any stored document in the DRM system ("No" in step S42), indicating that it is a new document, the RMS server extracts metadata for the document, and applies protection to the document to generate a protected version of the document and adds it to the DRM system as a protected document (step S49). This step is similar to step S28 in the first embodiment, and it is performed only when the scanner transmitted the scanned document image to the RMS server. Then, depending on what action—save or distribute—the user has indicated in step S31, the RMS server either transmits an authorization-granted response to the scanner with the protected version of the document, or sends the protected version of the document to the list of recipients by email (step S50). The scanner, in response to the authorization-granted response, will save the protected version of the document (step S33).

It should be note that in the various steps that involve the electronic version of the document, e.g. steps S13, S24-S25, S33, S44-S45, S46-S47, S50, S53, S64-S65, the electronic version is a DRM-protected document, the access to which being protected by the DRM system. Moreover, in both the first and second embodiments, when the electronic version of the document is ultimately printed, e.g., printed on the printer in the first embodiment (step S13), or saved by the user and later printed or received via email by recipients and later printed in the second embodiment, the printed document that is generated from a protected electronic version will be a first generation copy, i.e. one that carries an inconspicuous security pattern. The electronic version stored in the DRM system typically does not contain a security pattern. Thus, a security pattern will be added before the document is ultimately printed; this can be done by the RMS server before transmitting the electronic version to the printer or scanner; by the scanner in the second embodiment if the email is sent from the scanner to the recipients; or by another printer which prints the saved or emailed electronic version in the second embodiment. In other words, the technique for adding the security pattern can be implemented in any of the devices that handle the documents; since the electronic version of the documents are protected by the DRM system, the requirement that hardcopies of a protected document carry a security pattern can be enforced as a part of the access control mechanism implemented by the DRM system.

This embodiment can also be used to prevent unauthorized scanning of protected document using digital cameras or mobile phones. Such digital cameras or mobile phones are equipped with software that performs the process shown in FIG. 2A.

Figure 3A:
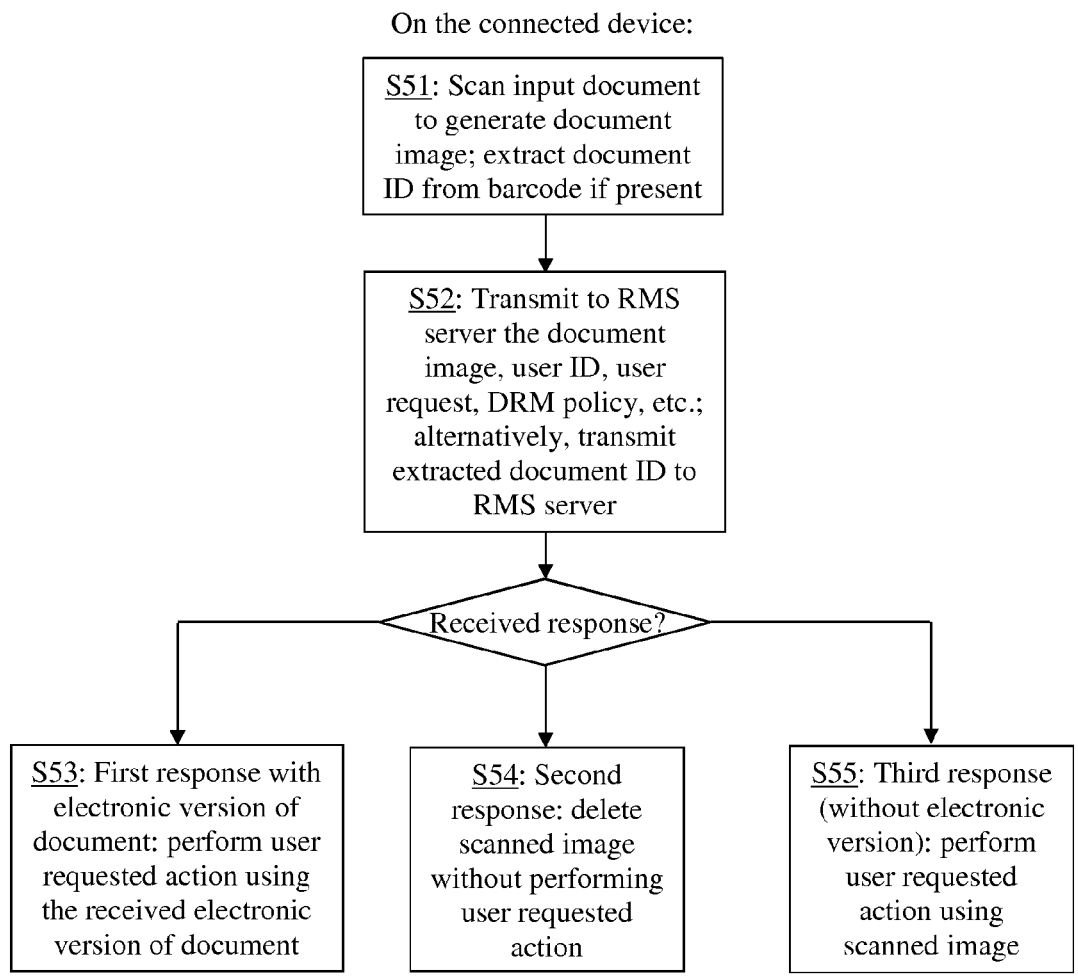
FIGS. 3A and 3B are flowcharts that schematically illustrate a method of performing a user requested action with respect to a hardcopy document according to a third embodiment of the present invention.
Figure 3B:
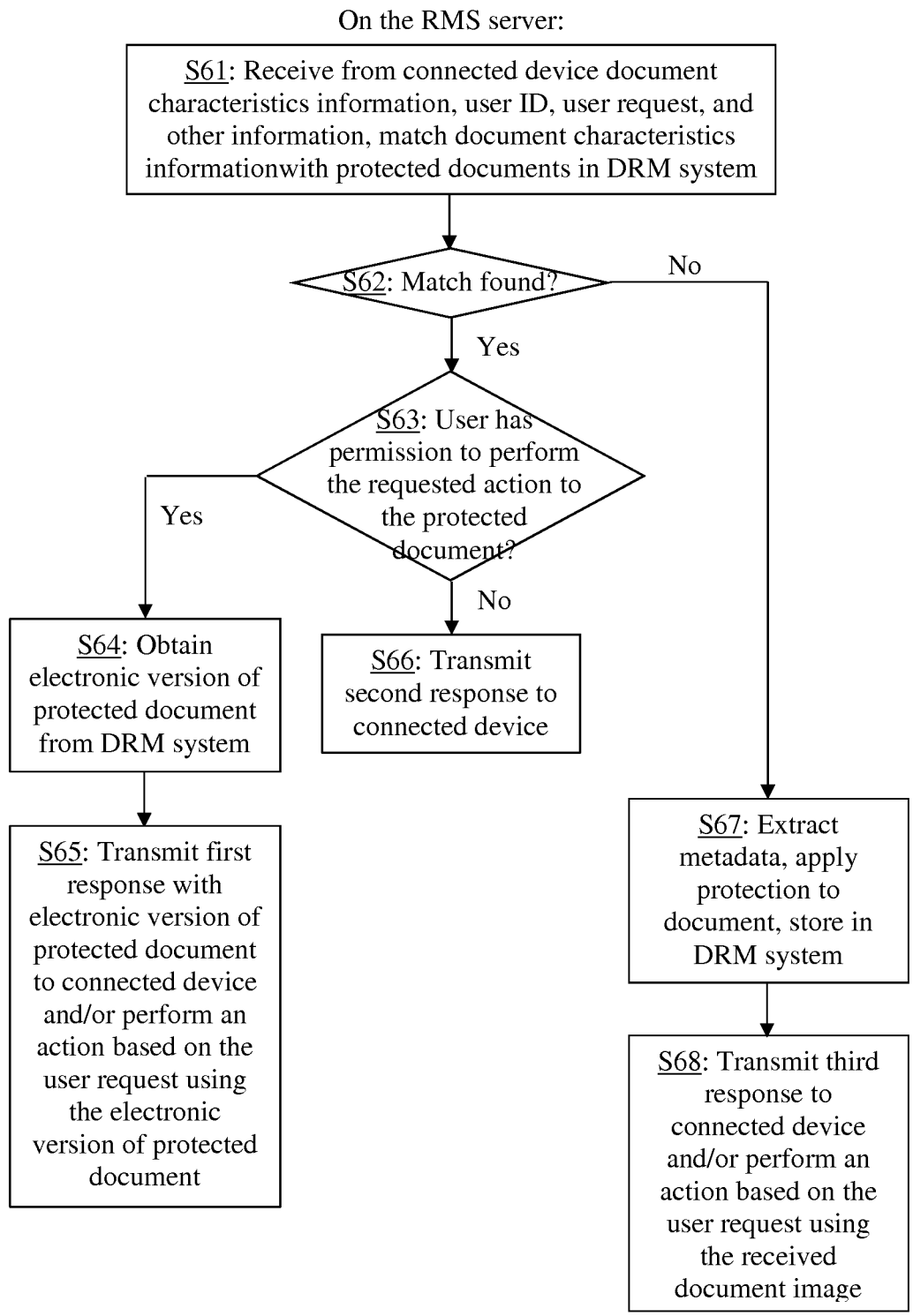

The first and second embodiments may be summarized in the flowcharts in FIGS. 3A and 3B. FIG. 3A illustrates the steps performed by a connected device which may be a copier or scanner or MFP connected to the RMS server, and FIG. 3B illustrates the steps performed by the RMS server.

A user, who is a registered user of the DRM system, instructs the connected device to perform a requested action with respect to an input hardcopy document. The requested action may be copying, scanning and saving, scanning and distributing, etc. In response to the user instruction, the connected device scans the input hardcopy document to generate a document image (step S51), and transmits the document image to the RMS server along with other information such as the ID of the user, a DRM protection policy to be applied to the document, etc. (step S52). Alternatively, when a document ID has been encoded in a barcode present in the document image, the document ID is extracted in step S51 and transmitted to the RMS server instead of or in addition to the document image in step S52.

The RMS server, upon receiving the document image and/or document ID (more generally referred to as the document characteristics information) from the connected device, performs document matching to determine whether the document matches (i.e. is the same as) one of the protected documents stored in the DRM system (step S61). If the document characteristics information matches that of a protected document on the RMS server ("Yes" in step S62), the RMS server further determines, based on the DRM database, whether the user has permission to perform the requested action (copy, scan, distribute, etc.) to the protected document (step S63).

If the user has the permission to perform the requested action ("Yes" in step S63), the RMS server obtains from the DRM system an electronic version of the matched protected document (step S64), and transmits a first response along with the electronic version of the document to the connected device (step S65). The connected device, in response to receiving the first response along with the electronic version of the protected document, performs the requested action using the electronic version of the protected document (step S53). Step S65 may additionally or alternatively include the RMS server performing an action based on the user request using the electronic version of protected document, for example, emailing a copy of the electronic version of protected document to email recipients if the user request is to distribute the document.

On the RMS server, if in step S63 it is determined that the user does not have the permission to perform the requested action ("No" in step S63), the RMS server transmits a second response to the connected device (step S66). The connected device, in response to receiving the second response, deletes the scanned image without performing the requested action (step S54), thereby preventing the user from performing the unauthorized action to the input hardcopy document. On the RMS server, if the document characteristics information from the connected device does not match that of any protected document in the DRM system ("No" in step S62), indicating that it is a new document, the RMS server extracts metadata for the document and applies protection to the document and adds it to the DRM system as a protected document (step S67) (note that this step is performed only when the connected device has transmitted the scanned document image to the RMS server). The RMS server also transmits a third response to the connected device (but without an electronic version) (step S68). The connected device, in response to the third response, performs the user requested action using the document image generated by the scanning step S51 (step S55). Step S68 may additionally or alternatively include the RMS server performing an action based on the user request using the document image received from the connected device, for example, emailing a copy of the document image to email recipients if the user request is to distribute the document.

It will be apparent to those skilled in the art that various modification and variations can be made in the method for controlling copying and scanning of a hardcopy document of the present invention without departing from the spirit or scope of the invention. Thus, it is intended that the present invention cover modifications and variations that come within the scope of the appended claims and their equivalents.

What is claimed is:

1. A method for generating a hardcopy of an input hardcopy document, implemented in a system including a connected device and a server connected to each other, the connected device being a copying device and/or a scanning device, the method comprising:
    maintaining, by the server, a digital rights management (DRM) system which stores a plurality of protected documents and a DRM database containing user access permission information;
    in response to instructions from a user to perform a requested action, scanning, by the connected device, the input hardcopy document to generate a scanned document image, obtaining document characteristics information from the scanned document image, and transmitting the document characteristics information to the server along with an identity of the user and the requested action, the requested action being one of: making a hardcopy of the input document, scanning the input document to generate an electronic version and to save the electronic version, and scanning the input document to generate an electronic version and to distribute the electronic version to specified recipients;
    performing, by the server, document matching to determine whether the document characteristics information received from the connected device matches that of any of the plurality of protected documents stored in the DRM system;
    when the document characteristics information matches that of a protected document stored in the DRM system:
    determining by, the server, based on the DRM database, whether the user has permission to perform the requested action to the matched protected document;
    when the user is determined to have permission to perform the requested action to the matched protected document, transmitting, by the server, a first response with an electronic version of the matched protected document to the connected device, or completing the requested action using the electronic version of the matched protected document in place of the scanned document image generated by the connected device in the scanning step, wherein the electronic version of the matched protected document is obtained from information pre-stored in the DRM system maintained by the server, and the electronic version is different from the scanned document image generated by the connected device in the scanning step; and
    when the user is determined to have no permission to perform the requested action to the matched protected document, transmitting, by the server, a second response to the connected device; and
    in response to receiving the first response with the electronic version of the matched protected document from the server, completing, by the connected device, the requested action using the received electronic version of the protected document in place of the scanned document image generated by the connected device in the scanning step, and in response to the second response, deleting, by the connected device,the document image generated by scanning the input hardcopy document without performing the requested action.

2. The method of claim 1, wherein the document characteristics information includes either the scanned document image generated by scanning the input hardcopy document, or a document ID extracted from the scanned document image, or both.

3. The method of claim 1, further comprising:
when the document characteristics information matches that of none of the protected documents stored in the DRM system, transmitting, the server, a third response to the connected device, or completing the requested action using the scanned document image received from the connected device; and
in response to the third response, completing, by the connected device, the requested action using the scanned document image.

4. The method of claim 3, wherein the requested action is to make a hardcopy of the input document.

5. The method of claim 4, wherein the input hardcopy document contains an inconspicuous security pattern, wherein in response to the first response, printing, by the connected device, the hardcopy document using the received electronic version of the protected document and the printed document contains an inconspicuous security pattern, and wherein in response to the third response, printing, by the connected device, the hardcopy using the scanned document image generated by scanning the input hardcopy document and the printed hardcopy contains a conspicuous security pattern.

6. The method of claim 5, wherein the electronic version of the protected document contains no security pattern, and wherein the step of printing the hardcopy document using the received electronic version of the protected document includes adding an inconspicuous security pattern to the printed hardcopy document.

7. The method of claim 3, further comprising:
when the document characteristics information matches that of none of the protected, documents stored in the DRM system, apply, by the server, digital rights to the scanned document image, including: encrypting the document, storing the encrypted document in the DRM system, and storing user access permission information for the document in the DRM database.

8. The method of claim 1, wherein the requested action is to scan the input document to generate an electronic version and to save the electronic version.

9. The method of claim 1, wherein the requested action is to scan the input document to generate an electronic version and to distribute the electronic version to specified recipients.

10. The method of claim 9, wherein when the document characteristics information matches that of one of the plurality of protected documents stored in the DRM system and when the user is determined to have permission to distribute the protected document to the specified recipients, distributing, by the server, the electronic version of the protected document to the specified recipients.

11. A computer program product comprising a computer usable non-transitory medium having a computer readable program code embedded therein for controlling a server, the computer readable program code configured to cause the server to execute a digital rights management (DRM) process, the process comprising:
maintaining a DRM system which stores a plurality of protected documents and a DRM database containing user access permission information;
receiving, from a connected device, document characteristics information, an identity of a user and a requested action, the requested action being one of: making a hardcopy of an input document, scanning the input document to generate an electronic version and to save the electronic version, and scanning the input document to generate an electronic version and to distribute the electronic version to specified recipients;
performing document matching to determine whether the document characteristics information received from the connected device matches that of any of the plurality of protected documents stored in the DRM system; and
when the document Characteristics information matches that of a protected document stored in the DRM system:
determining, based on the DRM database, whether the user has permission to perform the requested action to the matched protected document;
when the user is determined to have permission to perform the requested action to the matched protected document, transmitting a first response with an electronic version of the matched protected document to the connected device, or completing the requested action using the electronic version of the matched protected document, wherein the electronic version of the matched protected document is obtained from information pre-stored in the DRM system maintained by the server; and
when the user is determined to have no permission to perform the requested action to the matched protected document, transmitting a second response to the connected devices;
the computer program product further comprising another computer usable non-transitory medium having another computer readable program code embedded therein for controlling the connected device, the other computer readable program code configured to cause the connected device to execute a copying process, the process comprising:
in response to instructions from a user to perform a requested action, scanning the input hardcopy document to generate a scanned document image, obtaining document characteristics information from the scanned document image, and transmitting the document characteristics information to the server along with an identity of the user and the requested action, the requested action being one of: making a hardcopy of the input document, scanning the input document to generate an electronic version and to save the electronic version, and scanning the input document to generate an electronic version and to distribute the electronic version to specified recipients;
in response to receiving the first response with the electronic version of the matched protected document from the server, wherein the electronic version is different from the scanned document image generated in the scanning step, completing the requested action using the received electronic version of the protected document in place of the scanned document image generated by the connected device in the scanning step, and
in response to the second response, the connected device deleting the document image generated by scanning the input hardcopy document without performing the requested action.

12. The computer program product of claim 11, wherein the document characteristics information includes either a scanned document image generated by scanning an input hardcopy document, or a document ID extracted from the scanned document image, or both.

13. The computer program product of claim 11, wherein the requested action is to scan the input document to generate an electronic version and to distribute the electronic version to specified recipients, and wherein when the document characteristics information matches that of one of the plurality of protected documents stored in the DRM system and when the user is determined to have permission to distribute the protected document to the specified recipients, the step of completing the requested action using the electronic version of the matched protected document includes distributing the electronic version of the protected document to the specified recipients.

14. The computer program product of claim 11, wherein the DRM process further comprises:
   when the document characteristics information matches that of none of the protected documents stored in the DRM system, transmitting a third response to the connected device, or completing the requested action using a scanned document image of the hardcopy document received from the connected device.

15. The computer program product of claim 14, wherein the DRM process further comprises:
   when the document characteristics information matches that of none of the protected documents stored in the DRM system, applying digital rights to the scanned document image, including: encrypting the document, storing the encrypted document in the DRM system, and storing user access permission information for the document in the DRM database.

\* \* \* \* \*